United States Patent [19]
Oshiro et al.

[11] Patent Number: 5,669,030
[45] Date of Patent: Sep. 16, 1997

[54] FILM FEEDER FOR AUTOMATIC DEVELOPING MACHINE

[75] Inventors: Akira Oshiro; Makoto Ochi; Makoto Takahashi, all of Itabashi-ku, Japan

[73] Assignee: Copal Company Limited, Tokyo, Japan

[21] Appl. No.: 579,669

[22] Filed: Dec. 27, 1995

[30] Foreign Application Priority Data

Dec. 28, 1994 [JP] Japan .................................. 6-327607

[51] Int. Cl.$^6$ .............................. G05D 13/00; G03D 3/08
[52] U.S. Cl. ...................... 396/567; 396/599; 396/613; 396/620; 396/622; 83/367; 83/373
[58] Field of Search .................... 354/298, 308–310, 354/313, 317, 319–324; 355/69, 77, 27–29; 363/63, 74; 396/567, 599, 620, 622, 630; 83/203, 205, 208, 242, 359, 361, 364, 367, 372, 373; 323/242, 234

[56] References Cited

U.S. PATENT DOCUMENTS

| | | |
|---|---|---|
| 4,771,312 | 9/1988 | Yanase et al. .............................. 355/69 |
| 4,791,443 | 12/1988 | Foley et al. .............................. 354/321 |
| 5,250,974 | 10/1993 | Iwasaki et al. .......................... 354/319 |

FOREIGN PATENT DOCUMENTS

| | | |
|---|---|---|
| 4022887C2 | 2/1991 | Germany . |
| 4108259C2 | 10/1991 | Germany . |
| 4134253A1 | 4/1992 | Germany . |
| 4226529A1 | 2/1994 | Germany . |
| 4432444A1 | 3/1995 | Germany . |
| 4340350A1 | 6/1995 | Germany . |
| 4-78853A | 3/1992 | Japan . |
| 3-15063A | 1/1993 | Japan . |

*Primary Examiner*—D. Rutledge
*Attorney, Agent, or Firm*—Hickman Beyer & Weaver

[57] ABSTRACT

In a film feeder for use in an automatic developing machine, a cutter control circuit actuates a cutter using electrical energy from a utility power source and electrical energy stored in a capacitor if a film end sensor detects the tail end of a film during normal feeding conditions. In the event that the film end sensor detects the tail end of the film in the event of a power failure, the cutter control circuit actuates the cutter using the electrical energy stored in the capacitor. This makes it possible to actuate the cutter even in the event of a power failure as well as to reduce the capacitance of the utility power source to a small level.

6 Claims, 4 Drawing Sheets

FILM FEEDER FOR AUTOMATIC DEVELOPING MACHINE

BACKGROUND OF THE INVENTION

1. Field of the Invention

This invention relates to a film feeder for use in an automatic developing machine and, more particularly to, a film feeder for use in an automatic developing machine in which a film is withdrawn from a film cartridge and the thus drawn film is fed to an automatic developing machine that automatically processes the film while conveying the same utilizing a power supply from a utility power source.

2. Related Background Art

In an automatic developing machine, a film withdrawn from a film cartridge is conveyed so as to undergo developing, bleaching, fixing, and rinsing treatments in sequence. The film is conveyed using sprockets which engage with perforations formed at predetermined intervals in a leader attached to the leading end of the film. The tail end of the film coiled around the film cartridge is affixed to a spool in the film cartridge, and hence the film becomes tensioned immediately before being completely withdrawn from the film cartridge. The automatic developing machine detects the tail end of the film by sensing the tensioned state of the film using a sensor, and actuates a cutter so as to cut the film in the vicinity of its tail end portion.

As is the case with an ordinary household, the previously mentioned automatic developing machine receives a power supply from an electric-power company. For this reason, in the event of a power failure, the drive system of the developing machine stops, and the film remains immersed in whichever processing bath, thereby resulting in damage to the film. To avoid such a trouble, it is necessary to discharge the film from the automatic developing machine.

In such a case, the film is conveyed manually using a handle, and the tail end region of the film is cut by manually actuating the cutter. Thereafter, the film is removed from the automatic developing machine. Thus, a very laborious operation was needed to remove the film from the automatic developing machine.

To reduce the burden on an operator when the film is taken out of the automatic developing machine, a film feeder for use in an automatic developing machine disclosed in Unexamined Japanese Patent Laid-Open No. 4(1992)-78852 (corresponding to U.S. Pat. No. 5,250,974) has been proposed. Specifically, in this film feeder, a capacitor is charged by electrical energy fed from a utility power supply circuit during normal feeding conditions. In the event of a power failure, switching means switches the supply of electrical energy from the utility power source circuit to the capacitor, and the cutter is actuated by this electrical energy so as to cut the film.

In this conventional configuration, the cutter is actuated using the electrical energy supplied from the utility power supply circuit during normal feeding conditions. In contrast, in the event of a power failure, the cutter is actuated using the electrical energy discharged from the capacitor as a result of switching action of switching means. In this way, the conventional apparatus requires switching means, which complicates a circuit configuration.

SUMMARY OF THE INVENTION

The object of the present invention is to provide a film feeder for use in an automatic developing machine which can actuate a cutter for cutting a film even in the event of a power failure as well as actuate the cutter using a power supply fed from a utility power source with small capacitance.

According to a first aspect of this invention, the above object is achieved by a film feeder for an automatic developing machine which withdraws a film from a film cartridge and feeds the thus withdrawn film to an automatic developing machine that automatically processes the film while conveying the same, the film feeder comprising:

- a film end sensor for detecting the tail end of the film withdrawn from the film cartridge;
- a cutter for cutting the film in the vicinity of the tail end thereof;
- a capacitor for actuating the cutter, which is charged by a utility power source during normal feeding conditions;
- a capacitor charging circuit for charging the capacitor;
- a capacitor discharging circuit for causing the capacitor to discharge electrical energy stored therein;
- a power-failure detecting circuit for detecting the interruption of the feeding of the power supply from the utility power source; and
- a cutter control circuit which actuates the cutter using the electrical energy from the utility power supply and the electrical energy stored in the capacitor if the film end sensor detects the tail end of the film during normal feeding conditions, and which actuates the cutter using the electrical energy discharged from the capacitor by means of the capacitor discharging circuit if the power-failure detecting circuit detects a power failure and the film end sensor detects the tail end of the film.

According to a second aspect of the present invention, there is provided a film feeder for an automatic developing machine which withdraws a film from a film cartridge and feeds the thus withdrawn film to an automatic developing machine that automatically processes the film while conveying the same, the film feeder comprising:

- a film end sensor for detecting the tail end of the film withdrawn from the film cartridge;
- a cutter for cutting the film in the vicinity of the tail end thereof;
- a capacitor for actuating the cutter, which is charged by a utility power source during normal feeding conditions;
- a capacitor charging circuit for charging the capacitor;
- a capacitor discharging circuit for causing the capacitor to discharge electrical energy stored therein;
- a power-failure detecting circuit for detecting the interruption of the feeding of the power supply from the utility power source; and
- a cutter control circuit which actuates the cutter using the electrical energy discharged from the capacitor if the film end sensor detects the tail end of the film during normal feeding conditions, and which actuates the cutter using the electrical energy discharged from the capacitor by means of the capacitor discharging circuit if the power-failure detecting circuit detects a power failure and the film end sensor detects the tail end of the film.

In the present invention, if the film end sensor detects the tail end of the film during normal feeding conditions, the cutter control circuit actuates the cutter using both the electrical energy supplied from the utility power source and the electrical energy discharged from the capacitor, or solely the electrical energy discharged from the capacitor. If the film end sensor detects the tail end of the film in the event of a power failure, the cutter control circuit actuates the cutter using the electrical energy stored in the capacitor. Accordingly, it is possible not only to reduce the capacitance of the utility power source to a small level but also to actuate the cutter in the event of a power failure.

If a manual cutting switch is operated during normal feeding conditions, the cutter is actuated using the electrical energy supplied from the utility power source and the electrical energy discharged from the capacitor, or the electrical energy from the capacitor. If the manual cutting switch is operated in the event of a power failure, the cutter is actuated using the electrical energy stored in the capacitor. Therefore, even if no film end detection signal is output from the film end sensor, or even if a cutter ON signal is not output for reasons of program errors, or the like, it is still possible to actuate the cutter.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

With reference to the accompanying drawings, preferred embodiments of the present invention will be described.

First Embodiment

Figure 1:
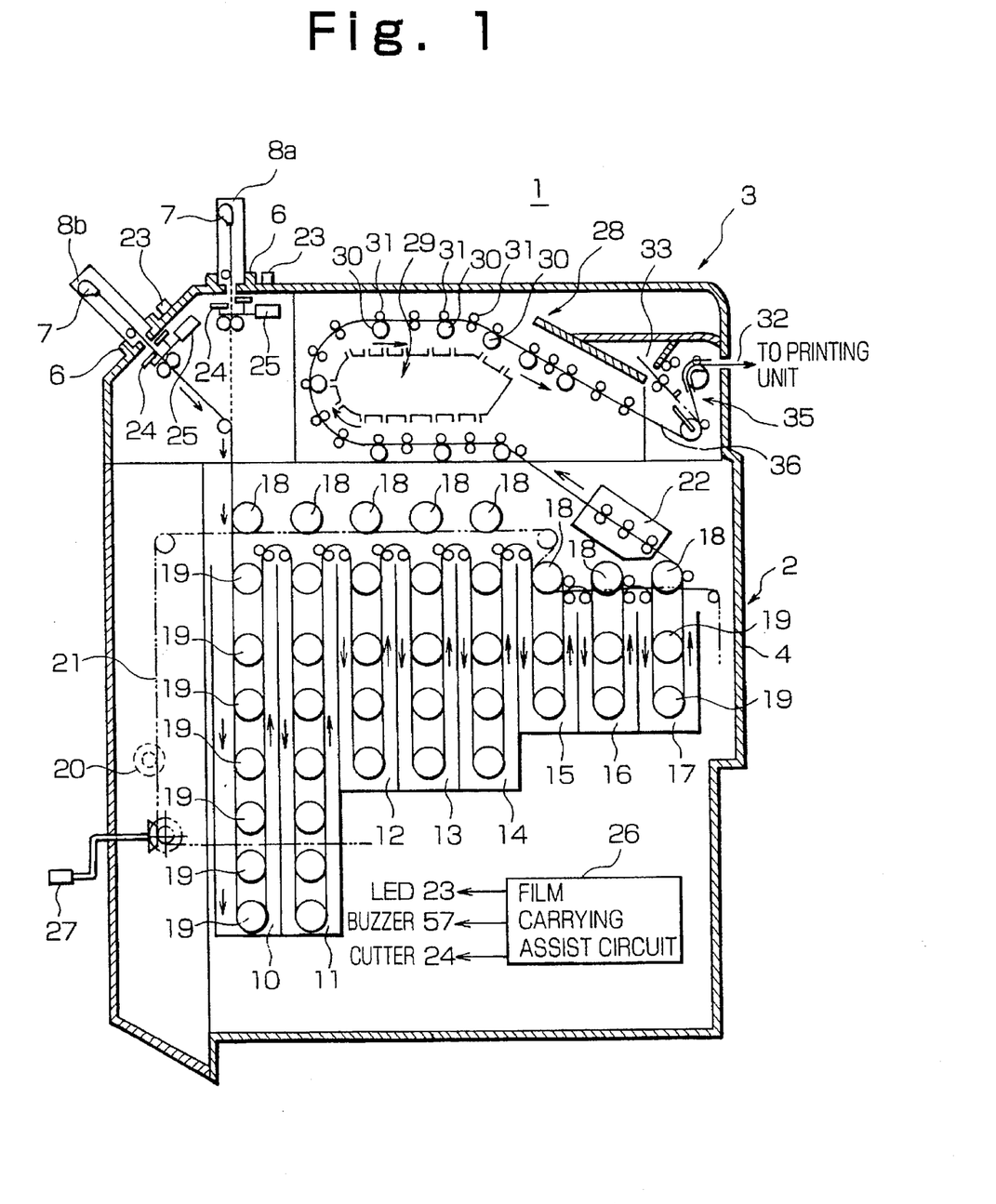
FIG. 1 is a schematic representation showing an automatic developing machine which employs a film feeder for an automatic developing machine according to the present invention.

FIG. 1 is a schematic representation showing an automatic developing machine which employs a film feeder for an automatic developing machine according to a first embodiment of the present invention. Throughout the drawings, the same reference numerals are provided to designate corresponding elements.

An automatic developing machine 1 is provided with a processing section 2 and a drying section 3. The processing section 2 and the drying section 3 are enclosed within a frame 4, which prevents the intrusion of external light. Two film cassette setting ports 6 are provided on top of the automatic developing machine 1 for receiving film cassettes 8a and 8b. The film cassettes 8a and 8b, each housing a film cartridge 7, are fitted into the respective film cassette setting ports 6, wherein the film cartridge 7 has a leader affixed to the leading end of a withdrawn film.

The processing section 2 incorporates developing baths 10, 11, a bleaching bath 12, fixing baths 13, 14, and rinsing baths 15 to 17. The developing baths 10 and 11 are filled with developer, and the bleaching bath 12 is filled with bleaching solution. The fixing baths 13 and 14 are filled with fixing solution, and the rinsing baths 15 to 17 are filled with rinsing water.

Sprocket wheels 18 for driving a rack are provided above the developing baths 10 and 11, the bleaching bath 12, the fixing baths 13 and 14, and the rinsing baths 15 to 17. Further, sprocket wheels 19 for carrying the leader of the film are provided inside the developing baths 10 and 11, the bleaching bath 12, the fixing baths 13 and 14, and the rinsing baths 15 to 17. The sprocket wheels 18 are rotatively driven by a rack drive chain 21 which is further driven by a motor 20. The sprocket wheels 19 in each bath are driven by the sprocket wheels 18 disposed above that baths via bevel gears (not shown) provided on the rear surface of the processing section 2. Further, a squeezing unit 22 is provided above the rinsing baths 15 to 17 for removing water remaining on the film after it has been rinsed.

The processing section 2 is provided with a film carrying assist circuit 26. In the event of a power failure, this film carrying assist circuit 26 illuminates LEDs 23 provided close to the film cassette setting ports 6 and causes a buzzer 57 to sound. The film carrying assist circuit 26 feeds a current to a solenoid 25 so that the solenoid will actuate a cutter 24 during both utility power supply conditions and the power failure. An emergency handle 27 is also provided on the outside of the frame 4 of the processing section 2 so that the operator can drive the rack drive chain 21 in the event of a power failure.

The drying section 3 is provided with a film drier unit 28. This film drier unit 28 is made up of a drier duct 29, sprocket wheels 30 for conveying the film along the periphery of the drier duct 29, and sponge rollers 31. After the film has passed the film drier unit 28, the tape of the film is cut by a leader cutter 36 in a leader cutting unit 35, whereby the leader is separated from the film.

The frame 4 of the drying section 3 is provided with a film exit port 32 which discharges the film during normal feeding conditions, and a film exit port 33 which discharges the leader during normal feeding conditions but discharges the leader together with the film in the event of a power failure.

Figure 2:
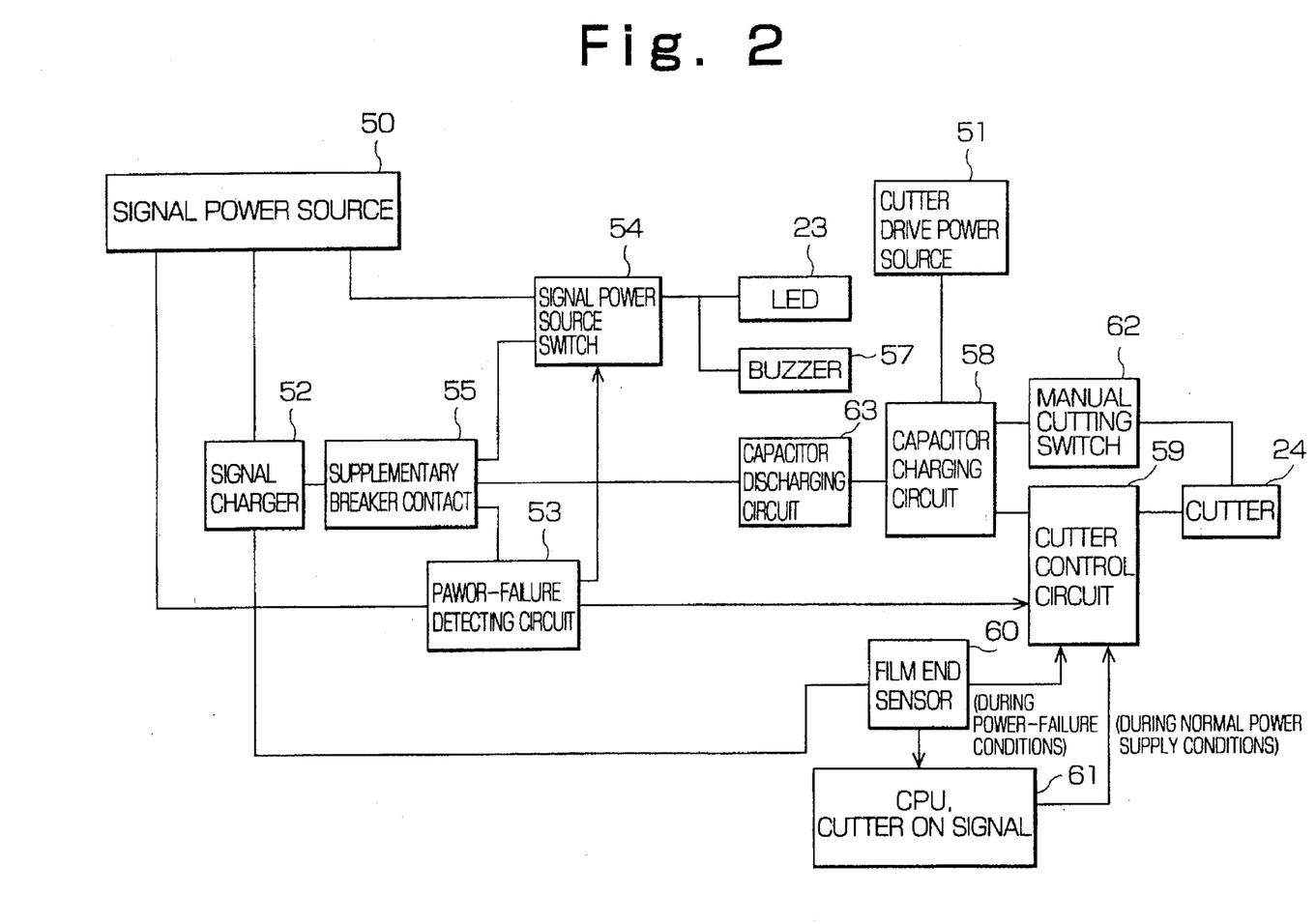
FIG. 2 is a block diagram showing a film carrying assist circuit used in the film feeder of the present invention.

FIG. 2 is a functional block diagram showing a film carrying assist circuit used in the film feeder according to the present invention. This film carrying assist circuit 26 is fed with electrical energy from a signal power source 50 and electrical energy from a cutter drive power source 51. The signal power source 50 is connected to a signal charger 52, so that the signal charger 52 is charged by the signal power source 50. This signal charger 52 is connected to a supplementary breaker contact 55 (feed interruption detecting means) which detects whether a main breaker (not shown) is turned on or off. A power-failure detecting circuit 53 is connected to both the signal power source 50 and the supplementary breaker contact 55. This power-failure detecting circuit 53 detects a power failure only while the main breaker is in an ON-state and provides a power-failure detection signal, as an output, to a signal power source switch 54, a cutter control circuit 59, the LEDs 23, and the buzzer 57.

The signal power source switch 54 is connected to the signal charger 52 via the signal power source 50 and the supplementary breaker contact 55. In the event that the power-failure detecting circuit 53 detects a power failure, a current fed to the power-failure warning means, that is, the LEDs 23 and the buzzer 57, is switched from the signal power source 50 to the signal charger 52.

The cutter drive power source 51 is connected to a capacitor charging circuit 58 for charging a capacitor provided in the capacitor charging circuit 58 during normal feeding conditions. When the cutter control circuit 59 receives an input of a cutter ON signal from a CPU 61 during normal feeding conditions, the cutter control circuit 59 actuates the cutter 24 using both electrical energy from the cutter drive power source 51 and electrical energy from the capacitor of the capacitor charging circuit 58.

Further, in the event of a power failure, the cutter control circuit 59 actuates the cutter 24 using the electrical energy stored in the capacitor of the capacitor charging circuit 58.

A manual cutting switch 62 is connected to the capacitor charging circuit 58, which allows the operator to manually actuate the cutter 24.

Furthermore, a capacitor discharging circuit 63 is connected to the supplementary breaker contact 55. If the turning off of the main breaker is detected through the supplementary breaker contact 55, the electrical energy stored in the capacitor of the capacitor charging circuit 58 is discharged.

Figure 3:
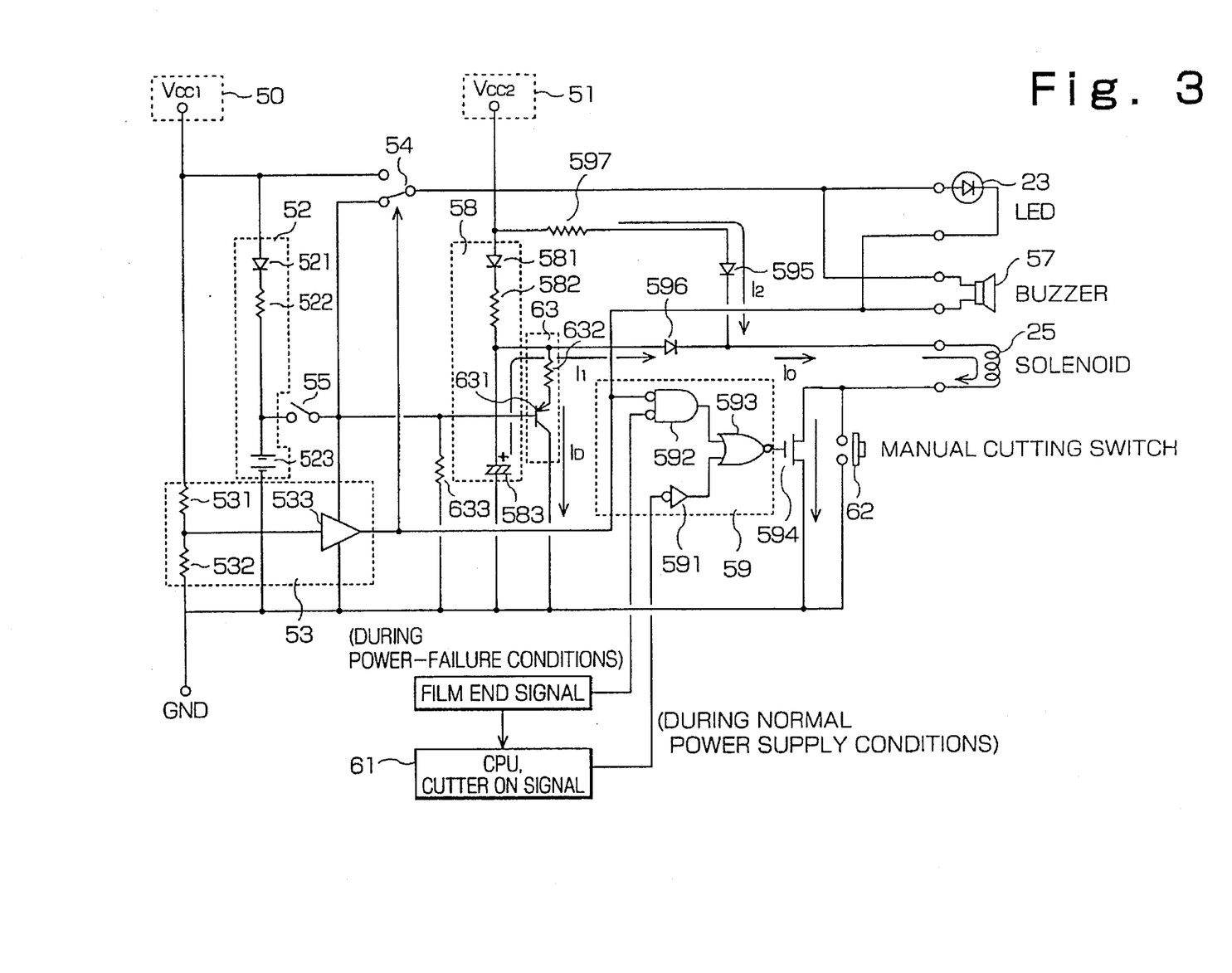
FIG. 3 is a specific circuit diagram of the film carrying assist circuit used in the film feeder according to a first embodiment of the present invention.

FIG. 3 is a specific circuit of the film carrying assist circuit used in the film feeder according to the first embodiment of the present invention.

In the drawing, a current flows into a battery 523 from the signal power source 50 (hereinafter referred to as $Vcc_1$) via a diode 521 and a resistor 522 during normal feeding conditions. Further, a current flows from the cutter drive power source 51 (hereinafter referred to as $Vcc_2$) to a capacitor 583 via a diode 581 and a resistor 582. In consequence, during normal feeding conditions, the battery 523 and the capacitor 583 are charged with electrical energy. Further, the supplementary contact 55 of the breaker is closed as a result of the turning on of the main breaker of the automatic developing machine. In this state, if the film end sensor 60 (FIG. 2) detects the tail end of the film, a film-end signal is input to an AND circuit 592. An output of a cutter ON signal from the CPU 61 is input to a NOT circuit 591. Outputs from the NOT circuit 591 and the AND circuit 592 are delivered to an FET (Field Effect Transistor) 594 via an OR circuit 593. Therefore, the FET 594 is turned on when either the film end signal or the cutter ON signal is input to the cutter control circuit 59. As a result, a composite current $I_0$ (=$I_1+I_2$), which is composed of a current $I_2$ supplied from $Vcc_2$ through a resistor 597 and a diode 595 and a current $I_1$ discharged from the capacitor 583 via a diode 596, flows to GND via the solenoid 25 and the FET 594.

As a result, the solenoid 25 is actuated by the current $I_0$, and the cutter 24 separates the film from the film cartridge. The current $I_1$ discharged from the capacitor 583 as well as the current $I_2$ supplied from $Vcc_2$ are used for driving the solenoid 25, which in turn allows the capacitance of the $Vcc_2$ to be reduced to a small level.

In the event of a power failure, the power-failure detecting circuit 53 detects the power failure. Specifically, the voltage of the $Vcc_1$ used as the power source for detection purposes becomes a potentially divided voltage determined by the resistors 531 and 532. A voltage appearing at an intermediate point between the resistors 531 and 532 is input to the voltage detecting circuit 533. The $Vcc_1$ is fed to the voltage detecting circuit 533 via the supplementary breaker contact 55, whereby the voltage detecting circuit 533 is activated. Further, in the event of a power failure, a current is fed from the battery 523 to the voltage detecting circuit 533. This allows the power-failure detecting circuit 53 to monitor the state of $Vcc_1$ and detect a power failure only while the supplementary breaker contact 55 is in an ON state.

If the power-failure detecting circuit 53 detects a power failure, a power-failure detection signal is input to the signal power source switch 54, so that the signal power source switch 54 operates to switch the signal power source from $Vcc_1$ to the battery 523. As a result, the LED 23 illuminates, and the buzzer 57 sounds in the event of a power failure.

The power-failure detection signal is also input to the AND circuit 592 of the cutter control circuit 59. Therefore, when the film end sensor 60 (FIG. 2) detects the tail end of the film in the event of a power failure, a film end signal is input to the AND circuit 592, and the FET 594 is turned on. The current $I_1$ discharged from the capacitor 583 via a diode 596 flows to GND through the FET 594.

In consequence, the solenoid 25 is actuated by the discharged current $I_1$, so that the cutter 24 separates the film from the film cartridge. In this way, the cutter 24 can operate even in the event of a power failure, which in turn makes it possible to prevent the film from being damaged.

The operation of the film carrying assist circuit associated with the actuation of the manual cutting switch 62 will now be described. When the manual cutting switch 62 is actuated during normal feeding conditions, the composite current $I_0$ (=$I_1+I_2$), which is composed of the current $I_2$ supplied from $Vcc_2$ through the resistor 597 and the diode 595 and the current $I_1$ discharged from the capacitor 583 via the diode 596, flows to GND via the solenoid 25 and the manual cutting switch 62. On the other hand, if the manual cutting switch 62 is actuated in the event of a power failure, the current $I_1$ discharged from the capacitor 583 via the diode 596 flows to GND through the solenoid 25 and the manual cutting switch 62.

As a result, the solenoid 25 is actuated, so that the cutter 24 separates the film from the film cartridge. If the film end signal is not issued despite the fact that the film end sensor 60 has detected the tail end of the film, or that the cutter ON signal is not issued for reasons of program errors, it is still possible to manually force the actuation of the cutter 24. Further, it is still possible to manually force the actuation of the cutter 24 even in the event of a power failure.

The operation of the film carrying assist circuit associated with the turning off of the main breaker of the automatic developing machine during normal feeding conditions will now be described.

If the main breaker of the automatic developing machine is turned off during normal feeding conditions, the supplementary breaker contact 55 is turned off. As a result, a resistor 633 is connected to GND, and a base current of a transistor 631 flows to GND through the resistor 633, so that the transistor 631 is turned on. When the transistor 631 is turned on, the current $I_D$ discharged from the capacitor 583 flows to GND via a resistor 632 and the transistor 631.

Accordingly, when the main breaker of the automatic developing machine is turned off, all the electrical energy stored in the capacitor 583 is discharged, which allows a serviceman to be protected from electric shock when performing maintenance.

With reference to FIGS. 1 and 2, the operation of the automatic developing machine and the operation of an operator required to actuate the automatic developing machine 1 will now be described.

To being with, the operator inserts the film cassette 8a (or 8b) that incorporates the film cartridge 7 into the film cassette setting port 6 and operates a start button (not shown), whereby a processing start instruction is provided to the automatic developing machine 1. The leader and the film are then withdrawn from the film cartridge 7 housed in the film cassette 8a (or 8b). The thus withdrawn leader and film are conveyed to the developing baths 10, 11, the bleaching bath 12, the fixing baths 13, 14, and the rinsing baths 15 to 17, in that order, along a film carrying path (designated by the arrow in FIG. 1), whereby the film is developed, bleached, fixed, and rinsed. Thereafter, the leader and the film are carried to the squeezing unit 22 and the film drier unit 28 one by one, so that the film is dried. If the film end sensor 60 detects the tail end of the film during the course of the above mentioned processing, the end signal output from the film end sensor 60 is input to the CPU 61. Subsequently, the cutter ON signal is delivered from the CPU 61 to the cutter control circuit 59, whereby the composite current, which consists of the current from the cutter drive power source 51 and the current discharged from the capacitor 583, flows to the solenoid 25. As a result, the cutter 24 is actuated to separate the film from the film cartridge 7. The film thus separated from the film cartridge 7 is conveyed to the developing baths 10, 11, the bleaching bath 12, the fixing baths 13, 14, and the rinsing baths 15 to 17, in that order. Further, the film is dried by the squeezing unit 22 and the film drier unit 28. Subsequently, the tape is cut by the lead tape cutter unit 35, whereby the leader and the film are separated from each other. In consequence, the film is discharged to the outside of the automatic developing machine 1 through the exit port 32, but the leader is discharged through the exit port 33.

If the power-failure detecting circuit 53 detects a power failure, the signal power source switch 54 switches the power source for the LEDs 23 and the buzzer 57 from $Vcc_1$ to the signal charger 52.

In association with this switching action, the power-failure warning means, i.e., the LEDs 23, illuminate to warn the operator that the withdrawal of the film cassettes 8a and 8b is prohibited. Concurrently, the buzzer 57 sounds, for example, 1 sec. intervals. The operator rotates the emergency handle 27 in synchronism with the beep sounds so as to discharge the film in the automatic developing machine 1 to the outside from the film exit port 33 for power failure use. Specifically, the operator rotates the emergency handle through an angle of, for example, 90 degrees every time the buzzer sounds, to discharge the film outside the automatic developing machine 1. Therefore, the time in which the film is immersed in each processing bath is controlled, which makes it possible to reduce the damage to the film to the minimum level.

If the film end sensor 60 detects the tail end of the film while the film is being discharged as a result of the previously mentioned operation of the emergency handle 27, the current discharged from the capacitor flows to the solenoid 25 to actuate the cutter 24, whereby the film is cut. In this way, as a result of continuous rotation of the emergency handle after the cutting of the film, the film can be discharged to the outside of the automatic developing machine 1, which enables the film to be protected from damage.

Second Embodiment

In the first embodiment, the explanation has been given of the actuation of the cutter using the electrical energy from the utility power source and the electrical energy stored in the capacitor during normal feeding conditions.

In this second embodiment, the actuation of the cutter using the electrical energy stored in the capacitor during normal feeding conditions will be described. FIGS. 1 and 2 are common to the first and second embodiments, and therefore their explanation will be omitted here for brevity.

Figure 4:
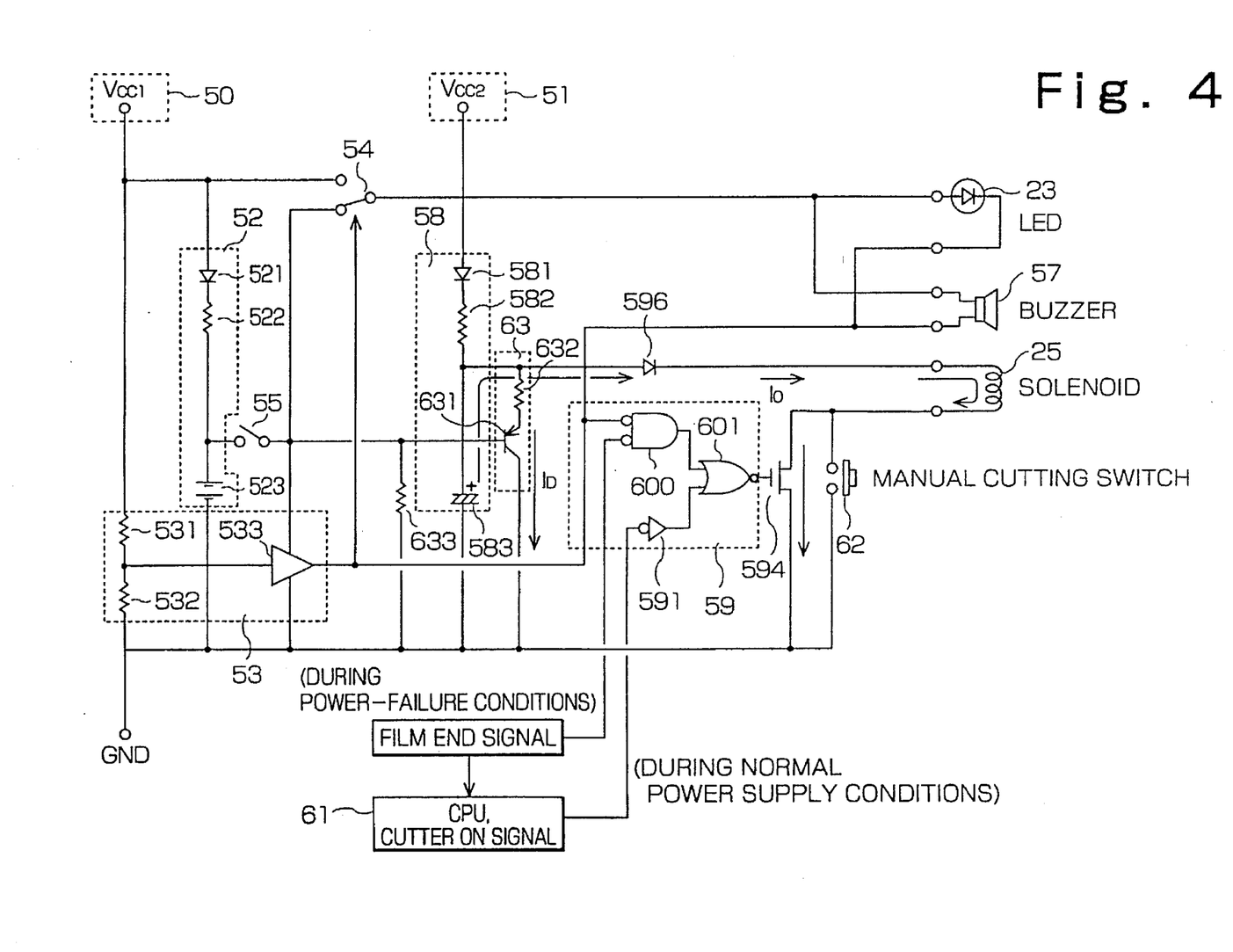
FIG. 4 is a specific circuit diagram of the film carrying assist circuit used in the film feeder according to a second embodiment of the present invention.

FIG. 4 is a specific circuit diagram showing a film carrying assist circuit used in a film feeder according to a second embodiment of the present invention.

In the drawing, the current supplied from the signal power source 50 (hereinafter referred to as $Vcc_1$) flows to the battery 523 via the diode 521 and the resistor 522 during normal feeding conditions. Further, the current flows from the cutter drive power source 51 (hereinafter referred to as $Vcc_2$) to the capacitor 583 via the diode 581 and the resistor 582. As a result, during normal feeding conditions, the battery 523 and the capacitor 583 are charged with electrical energy. Further, the supplementary contact 55 of the breaker is closed as a result of the turning on of the main breaker of the automatic developing machine. In this state, if the film end sensor 60 (FIG. 2) detects the tail end of the film, the film-end signal is input to a NAND circuit 600. The cutter ON signal output from the CPU 61 is input to the NOT circuit 591.

The outputs from the NOT circuit 591 and the NAND circuit 600 are delivered to the FET (Field Effect Transistor) 594 via a NOR circuit 601. Therefore, the FET 594 is turned on when the cutter ON signal is input to the cutter control circuit 59. As a result, the current $I_0$ discharged from the capacitor 583 via the diode 596 flows to GND via the solenoid 25 and the FET 594.

As a result, the solenoid 25 is actuated by the current $I_0$, and the cutter 24 separates the film from the film cartridge. Therefore, the current $I_0$ discharged from the capacitor 583 is used for driving the solenoid 25, which in turn allows the capacitance of the $Vcc_2$ to be reduced to a small level.

In the event of a power failure, the power-failure detecting circuit 53 detects the power failure. Specifically, the voltage of the $Vcc_1$ used as the power source for detection purposes becomes a potentially divided voltage determined by the resistors 531 and 532. A voltage appearing at an intermediate point between the resistors 531 and 532 is input to the voltage detecting circuit 533. $Vcc_1$ is fed to the voltage detecting circuit 533 via the supplementary breaker contact 55, whereby the voltage detecting circuit 533 is activated. Further, in the event of a power failure, a current is fed from the battery 523 to the voltage detecting circuit 533. This allows the power-failure detecting circuit 53 to monitor the state of $Vcc_1$ and detect a power failure only while the supplementary breaker contact 55 is in an ON state.

If the power-failure detecting circuit 53 detects a power failure, a power-failure detection signal is input to the signal power source switch 54, so that the signal power source switch 54 operates to switch the signal power source from $Vcc_1$ to the battery 523. As a result, the LEDs 23 illuminates, and the buzzer 57 sounds in the event of a power failure.

The power-failure detection signal is also input to the NAND circuit 600 of the cutter control circuit 59. Therefore, if the film end sensor 60 (FIG. 2) detects the tail end of the film in the event of a power failure, a film end signal is input to the NAND circuit 600, and the FET 594 is turned on. The current $I_0$ discharged from the capacitor 583 via the diode 596 flows to GND through the FET 594.

In consequence, the solenoid 25 is actuated by the discharged current $I_0$, so that the cutter 24 separates the film from the film cartridge. In this way, the cutter 24 can operate even in the event of a power failure, which in turn makes it possible to prevent the film from being damaged.

The operation of the film carrying assist circuit associated with the actuation of the manual cutting switch 62 will now be described. When the manual cutting switch 62 is actuated during normal feeding conditions, the current $I_0$ discharged from the capacitor 583 via the diode 596 flows to GND via the solenoid 25 and the manual cutting switch 62. On the other hand, if the manual cutting switch 62 is actuated in the event of a power failure, the current $I_0$ discharged from the capacitor 583 via the diode 596 flows to GND through the solenoid 25 and the manual cutting switch 62.

As a result, the solenoid 25 is actuated, so that the cutter 24 separates the film from the film cartridge. In the event that the film end signal is not issued despite the fact that the film end sensor 60 has detected the tail end of the film, or that the cutter ON signal is not issued for reasons of program errors, it is still possible to manually force the actuation of the cutter 24. Further, it is still possible to manually force the actuation of the cutter 24 even in the event of a power failure.

The operation of the film carrying assist circuit associated with the turning off of the main breaker of the automatic developing machine during normal feeding conditions will now be described.

If the main breaker of the automatic developing machine is turned off during normal feeding conditions, the supplementary breaker contact 55 is turned off. As a result, the base current of the transistor 631 flows to GND through the resistor 633, so that the transistor 631 is turned on. When the transistor 631 is turned on, the current $I_D$ discharged from the capacitor 583 flows to GND via the resistor 632 and the transistor 631.

Accordingly, when the main breaker of the automatic developing machine is turned off, all the electrical energy stored in the capacitor 583 is discharged, which allows a serviceman to be protected from electric shock from electric shock when performing maintenance.

The second embodiment is basically the same as the first embodiment with respect to the operation of the film feeder and the operation that the operator performs to actuate the automatic developing machine 1.

However, the second embodiment is different from the first embodiment in that if the cutter ON signal is delivered from the CPU 61 to the cutter control circuit 59 during normal feeding conditions, the current discharged from the capacitor flows to the solenoid 25, whereby the cutter 24 is actuated to separate the film from the film cartridge 7.

The film feeders of the first and second embodiments permit various types of automatic setting. If a test mode is selected as one of these settings, it is possible to verify solely the operation of the cutter using software in this mode. Even in this case, the cutter operation ON signal is output from the CPU to the cutter control circuit as a result of operation of a console panel by the operator, so that predetermined operations are then executed.

According to the present invention, during normal feeding conditions, the cutter is actuated to cut a film using the electrical energy stored in the capacitor, which allows the capacitance of the normal power source to be reduced. Further, in the event of a power failure, the cutter is actuated using the electrical energy stored in the capacitor, which facilitates the discharging of the film to the outside of the automatic developing machine carried out by the operator.

Further, it is also possible to forcefully actuate the cutter by use of the manual cutting switch. Accordingly, in the event that the film end detection signal is not output for reasons of faults in the film end sensor, or that the cutter ON signal is not output as a result of program errors, it is possible to discharge the film to the outside of the automatic developing machine without damaging the film.

If the main breaker is turned off, the electrical energy stored in the capacitor is discharged, which eliminates the risk of electric shock when a serviceman performs maintenance of the automatic developing machine.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 327607/1994 (6-327607) filed on Dec. 28, 1994, is hereby incorporated by reference.

What is claimed is:

1. A film feeder for an automatic developing machine which withdraws a film from a film cartridge and feeds the thus withdrawn film to an automatic developing machine that automatically processes the film while conveying the same, the film feeder comprising:

a film end sensor for detecting the tail end of the film withdrawn from the film cartridge;

a cutter for cutting the film in the vicinity of the tail end thereof;

a capacitor for actuating the cutter which is charged by a utility power source during normal feeding conditions;

a capacitor charging circuit for charging the capacitor;

a capacitor discharging circuit for causing the capacitor to discharge electrical energy stored therein;

a power-failure detecting circuit for detecting the interruption of the feeding of electrical energy from the utility power source; and a cutter control circuit which actuates the cutter using the electrical energy fed from the utility power source and the electrical energy from the capacitor if the film end sensor detects the tail end of the film during normal feeding conditions, and which actuates the cutter using the electrical energy discharged from the capacitor by means of the capacitor discharging circuit if the power-failure detecting circuit detects a power failure and the film end sensor detects the tail end of the film.

2. The film feeder for an automatic developing machine as defined in claim 1, further comprising a manual cutting switch for manually actuating the cutter, wherein the cutter control circuit actuates the cutter using the electrical energy from the utility power source and the electrical energy stored in the capacitor if the manual cutting switch is actuated during normal feeding conditions, and wherein the cutter control circuit actuates the cutter using the electrical energy discharged from the capacitor by means of the capacitor discharging circuit if the manual cutting switch is actuated during a power failure.

3. The film feeder for an automatic developing machine as defined in claim 1, further comprising:

a battery which is charged during normal feeding conditions;

power source switching means for switching the power source from the utility power source to the battery when the power-failure detecting circuit detects a power failure; and power-failure warning means for warning of a power failure using the battery in the event of a power failure.

4. A film feeder for an automatic developing machine which withdraws a film from a film cartridge and feeds the thus withdrawn film to an automatic developing machine that automatically processes the film while conveying the same, the film feeder comprising:

a film end sensor for detecting the tail end of the film withdrawn from the film cartridge;

a cutter for cutting the film in the vicinity of the tail end thereof;

a capacitor for actuating the cutter which is charged by a utility power source during normal feeding conditions;

a capacitor charging circuit for charging the capacitor;

a capacitor discharging circuit for causing the capacitor to discharge electrical energy stored therein;

a power-failure detecting circuit for detecting the interruption of the feeding of electrical energy from the utility power source; and a cutter control circuit which actuates the cutter using the electrical energy fed from the capacitor if the film end sensor detects the tail end of the film during normal feeding conditions, and which actuates the cutter using the electrical energy discharged from the capacitor by means of the capacitor discharging circuit if the power-failure detecting circuit detects a power failure and the film end sensor detects the tail end of the film.

5. The film feeder for an automatic developing machine as defined in claim 4, further comprising a manual cutting switch for manually actuating the cutter, wherein the cutter control circuit actuates the cutter using the electrical energy stored in the capacitor if the manual cutting switch is actuated during normal feeding conditions, and wherein the cutter control circuit actuates the cutter using the electrical energy discharged from the capacitor by means of the capacitor discharging circuit if the manual cutting switch is actuated during a power failure.

6. The film feeder for an automatic developing machine as defined in claim 4, further comprising:

a battery which is charged during normal feeding conditions;

power source switching means for switching the power source from the normal power source to the battery when the power-failure detecting circuit detects a power failure; and power-failure warning means for warning of a power failure using the battery in the event of a power failure.

* * * * *